United States Patent
Sethi et al.

(10) Patent No.: US 12,032,473 B2
(45) Date of Patent: Jul. 9, 2024

(54) MOVING AN APPLICATION CONTEXT TO THE CLOUD DURING MAINTENANCE

(71) Applicant: Dell Products L.P., Round Rock, TX (US)

(72) Inventors: Parminder Singh Sethi, Ludhiana (IN); Lakshmi Saroja Nalam, Bangalore (IN)

(73) Assignee: DELL PRODUCTS, Round Rock, TX (US)

( * ) Notice: Subject to any disclaimer, the term of this patent is extended or adjusted under 35 U.S.C. 154(b) by 0 days.

(21) Appl. No.: 17/994,833

(22) Filed: Nov. 28, 2022

(65) Prior Publication Data
US 2024/0176727 A1  May 30, 2024

(51) Int. Cl.
G06F 11/00 (2006.01)
G06F 11/36 (2006.01)

(52) U.S. Cl.
CPC ................ G06F 11/3664 (2013.01)

(58) Field of Classification Search
CPC .................................................. G06F 11/3664
See application file for complete search history.

(56) References Cited

U.S. PATENT DOCUMENTS

| | | | |
|---|---|---|---|
| 6,195,760 B1 * | 2/2001 | Chung | G06F 11/1438 714/13 |
| 7,251,745 B2 * | 7/2007 | Koch | H04L 69/163 714/4.11 |
| 7,401,248 B2 * | 7/2008 | Nakahara | G06F 11/203 714/E11.073 |
| 7,525,749 B2 | 4/2009 | Maejima et al. | |
| 7,590,981 B2 | 9/2009 | Gupta et al. | |
| 7,966,391 B2 | 6/2011 | Anderson et al. | |
| 8,078,448 B1 | 12/2011 | Wohlberg et al. | |
| 8,364,799 B2 | 1/2013 | Sakai | |
| 8,918,673 B1 * | 12/2014 | Rangaiah | G06F 11/008 714/4.11 |

(Continued)

FOREIGN PATENT DOCUMENTS

| | | |
|---|---|---|
| WO | 2021122516 A1 | 6/2021 |
| WO | 2022104396 A1 | 5/2022 |

OTHER PUBLICATIONS

Wu, Suzhen et al., Proactive Data Migration for Improved Storage Availability in Large-Scale Dat Centers, Sep. 2015, IEEE (15 pages).

*Primary Examiner* — Amine Riad
(74) *Attorney, Agent, or Firm* — Chamberlain, Hrdlicka, White, Williams & Aughtry; Aly Z. Dossa

(57) ABSTRACT

Embodiments described herein relate to methods, systems, and non-transitory computer readable mediums storing instructions for placing an application in an external environment such as a cloud or edge environment, when it is rendered unavailable on a local environment such as a local host. The application's instance is moved after a connection test reveals that the application, related applications, and/or underlying physical computing devices hosting the applications and/or their data, do not respond to the test within an acceptable level of performance. By placing the application instances in an external environment, the application(s) can continue to provide an adequate level of service to one or more users until the application can be restored to its better function local host.

20 Claims, 6 Drawing Sheets

(56) References Cited

U.S. PATENT DOCUMENTS

| | | | |
|---|---|---|---|
| 9,026,260 B1 | 5/2015 | Thornley et al. | |
| 9,086,941 B1 | 7/2015 | Siegel | |
| 9,397,930 B2 | 7/2016 | Drobinsky et al. | |
| 9,900,215 B2 | 2/2018 | Yang et al. | |
| 10,785,123 B2 | 9/2020 | Gonguet | |
| 11,424,989 B2 | 8/2022 | Jeuk et al. | |
| 11,588,893 B1 | 2/2023 | Sharma | |
| 11,595,269 B1 | 2/2023 | Ghosh et al. | |
| 2002/0138226 A1 | 9/2002 | Doane | |
| 2005/0216800 A1 | 9/2005 | Bicknell et al. | |
| 2006/0129771 A1 | 6/2006 | Dasgupta et al. | |
| 2007/0079170 A1 | 4/2007 | Zimmer et al. | |
| 2007/0198524 A1* | 8/2007 | Branda | H04L 67/1034 |
| 2008/0222218 A1 | 9/2008 | Richards et al. | |
| 2009/0307522 A1* | 12/2009 | Olson | G06F 11/2007 |
| | | | 714/E11.178 |
| 2011/0113224 A1 | 5/2011 | Isshiki et al. | |
| 2012/0072571 A1* | 3/2012 | Orzell | G06F 11/008 |
| | | | 718/1 |
| 2013/0103977 A1* | 4/2013 | Zimmermann | G06F 11/0751 |
| | | | 714/4.11 |
| 2014/0376385 A1* | 12/2014 | Boss | G06F 11/2294 |
| | | | 370/242 |
| 2015/0261518 A1 | 9/2015 | Viswanathan | |
| 2015/0278219 A1 | 10/2015 | Phipps | |
| 2016/0162280 A1 | 6/2016 | Murayama et al. | |
| 2016/0239395 A1 | 8/2016 | Madsen et al. | |
| 2018/0113728 A1 | 4/2018 | Musani et al. | |
| 2018/0152341 A1 | 5/2018 | Maeda et al. | |
| 2018/0262979 A1 | 9/2018 | Wang et al. | |
| 2019/0379595 A1 | 12/2019 | Ur et al. | |
| 2020/0104113 A1 | 4/2020 | Grill et al. | |
| 2020/0110655 A1 | 4/2020 | Harwood et al. | |
| 2020/0133772 A1 | 4/2020 | Dalmatov et al. | |
| 2020/0156243 A1 | 5/2020 | Ghare et al. | |
| 2020/0264930 A1 | 8/2020 | Mandagere et al. | |
| 2021/0153044 A1 | 5/2021 | Ramanathan et al. | |
| 2021/0165768 A1 | 6/2021 | D'halluin et al. | |
| 2022/0070648 A1 | 3/2022 | Krishan | |
| 2022/0075613 A1 | 3/2022 | Ramachandran | |
| 2022/0138081 A1 | 5/2022 | Varma et al. | |
| 2022/0158926 A1 | 5/2022 | Wennerström et al. | |
| 2022/0179683 A1 | 6/2022 | Verma et al. | |
| 2022/0272142 A1 | 8/2022 | Li et al. | |
| 2022/0283784 A1 | 9/2022 | Degen et al. | |
| 2022/0337493 A1 | 10/2022 | Sant et al. | |
| 2022/0337501 A1 | 10/2022 | Sant et al. | |
| 2022/0368602 A1 | 11/2022 | Adhav et al. | |
| 2023/0033886 A1 | 2/2023 | Goswami et al. | |
| 2023/0037124 A1 | 2/2023 | Mengwasser et al. | |
| 2023/0080047 A1 | 3/2023 | Bashir | |

* cited by examiner

MOVING AN APPLICATION CONTEXT TO THE CLOUD DURING MAINTENANCE

BACKGROUND

Computing devices often exist in environments that include many devices (e.g., servers, virtualization environments, storage devices, network devices, etc.). Such environments may, from time to time, in whole or in part, require being replicated (e.g., backed-up) and/or migrated (e.g., moved from one set of devices to another). Such replications and/or migrations often require copious amounts of investigation, coordination, time, and manual steps to be performed by any number of system administrators. When a migration is performed, the application must be taken off-line, this may affect other applications that are dependent on it to function or obtain data.

SUMMARY

In general, embodiments described herein relate to a method for maintaining availability of an application. The method begins by performing a connection test of an application located on a local production host. If the connection test fails, then the method replicates the application to an external environment to obtain a replicated application. The method then determines a cause of the connection test failure and the cause of the failure is then corrected. An additional test is performed to determine if the cause of the connection test failure has been corrected. If the additional test confirms that the cause of the connection test failure has been corrected, then the application is restored to the local production host. Restoring the application results in at least a state of the replicated application being transferred to the local production host.

In general, embodiments described herein relate to a non-transitory computer readable medium comprising computer readable program code. The computer readable code, which when executed by a computer processor, enables the computer processor to perform a method for maintaining availability of an application. The method begins by performing a connection test of an application located on a local production host. If the connection test fails, then the method replicates the application to an external environment to obtain a replicated application. The method then determines a cause of the connection test failure and the cause of the failure is then corrected. An additional test is performed to determine if the cause of the connection test failure has been corrected. If the additional test confirms that the cause of the connection test failure has been corrected, then the application is restored to the local production host. Restoring the application results in at least a state of the replicated application being transferred to the local production host.

In general, embodiments described herein relate to at least one local production host, which hosts a plurality of applications. The production host comprises at least one processor, a storage device, and at least one memory. The memory includes instructions, which when executed by the processor perform a method for maintaining availability of an application. The method begins by performing a connection test of an application located on the at least one local production host. If the connection test fails, then the method replicates the application to an external environment to obtain a replicated application. The method then determines a cause of the connection test failure and the cause of the failure is then corrected. An additional test is performed to determine if the cause of the connection test failure has been corrected. If the additional test confirms that the cause of the connection test failure has been corrected, then the application is restored to the at least one local production host. Restoring the application results in at least a state of the replicated application being transferred to the at least one local production host.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
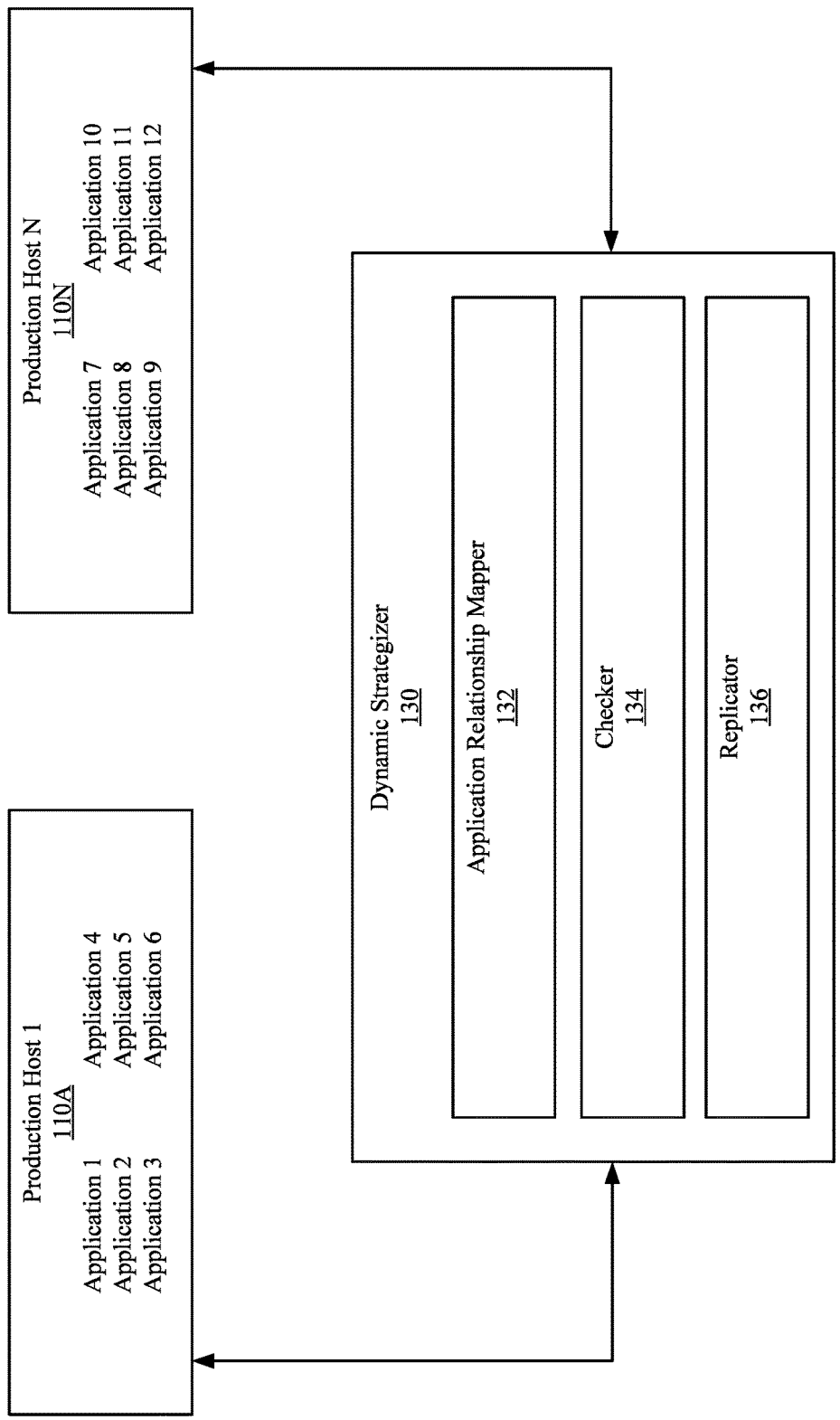
FIG. 1 shows a diagram of a system in accordance with one or more embodiments of the invention.

In the below description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the FIGURES, any component described with regards to a figure, in various embodiments described herein, may be equivalent to one or more like-named components described with regard to any other FIGURE. For brevity, descriptions of these components will not be repeated with regards to each FIGURE. Thus, each and every embodiment of the components of each FIGURE is incorporated by reference and assumed to be optionally present within every other FIGURE having one or more like-named components. Additionally, in accordance with various embodiments described herein, any description of the components of a FIGURE is to be interpreted as an optional embodiment, which may be implemented in addition to, in conjunction with, or in place of the embodiments described with regard to a corresponding like-named component in any other FIGURE.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for maintaining application instances or contexts when the instance or context on the local host fails one or more connection test, for example, after a migration. The method performs the connection test, and when the connection test fails, the method transfers or migrates the application instance to the edge or cloud environment, while a user, administrator, or other appropriate entity performs corrections to hopefully restore the application to local production host. The method continues to periodically test the application, related applications, and/or their underlying computing devices which host the applications. The connection test as well as the subsequent other periodical tests establishes whether the application has successfully come on-line, that the connections between it and all the applications and components that are related to it have been re-established with performance within a predetermined threshold.

While primarily described as being performed on applications after being migrated, one or more embodiments of the invention are not limited to applications that are being migrated and may be related to any aspects of an information handling system comprising of one or more servers and other computing devices being migrated, that affects the functioning of other applications and/or aspects of one or more other components of the information handling system and/or other information handling systems.

FIG. 1 shows a diagram of a system that performs the claimed methods in one or more embodiments of the invention. The system includes a plurality of production hosts (110A and 110N) and a dynamic strategizer (130) in accordance with one or more embodiments described herein. For simplicity, the system shown in FIG. 1 only shows two production hosts (110A and 110N), however, they are only representative and a subset of the system.

In one or more embodiments of the invention, one or more applications (e.g., applications 1-12) or their instances/context are hosted by the production hosts (e.g., 110A-110N). These applications, in one or more embodiments of the invention, perform computer implemented services for clients (not shown). Performing the computer implemented services may include performing operations on assets (applications related data or other data) that are stored in virtual storage devices that are either part of the production host or separate connected storage devices (not shown). The operations may include creating elements of assets/data, moving elements of assets/data, modifying elements of assets/data, deleting elements of assets/data, and other and/or additional operations on asset data without departing from the invention. The application(s) may include functionality for performing the aforementioned operations on the asset data in the production hosts (e.g., 110A-110N). The application(s) may be, for example, instances of databases, email servers, and/or other applications. The production hosts (e.g., 110A-110N) may host other types of applications without departing from the invention, including hosting the checker (120).

In one or more of embodiments of the invention, the applications are implemented as computer instructions, e.g., computer code, stored on a persistent storage or virtual storage devices, that when executed by a processor(s) of the production hosts cause the production hosts (e.g., 110A-110N) to provide the functionality of the application(s) described throughout this application.

The production hosts (e.g., 110A-110N) may include physical storage or logical/virtual storage (not shown). One or more of the production hosts (e.g., 110A-110N), may be externally located on a cloud or other external location. The logical storage devices may utilize any quantity of hardware storage resources of any number of computing devices for storing data. For example, the persistent storage may utilize portions of any combination of hard disk drives, solid state disk drives, tape drives, and/or any other physical storage medium of any number of computing devices.

In one or more embodiments of the invention, the production hosts (e.g., 110A-110N) may host virtual machines (VMs) that host the above-discussed applications. Each of the production hosts (e.g., 110A-110N) may host any number of VMs that, in turn, host any number of applications. Each of the production hosts (e.g., 110A-110N) may host or be operatively connected to a plurality of virtual storage devices (not shown). Alternatively, in one or more embodiments of the invention, the virtual storage devices may instead be physical storage devices such as hard disk drive, solid disk drive, tape drives, and or other physical storage mediums of any number of computing devices.

Figure 6:
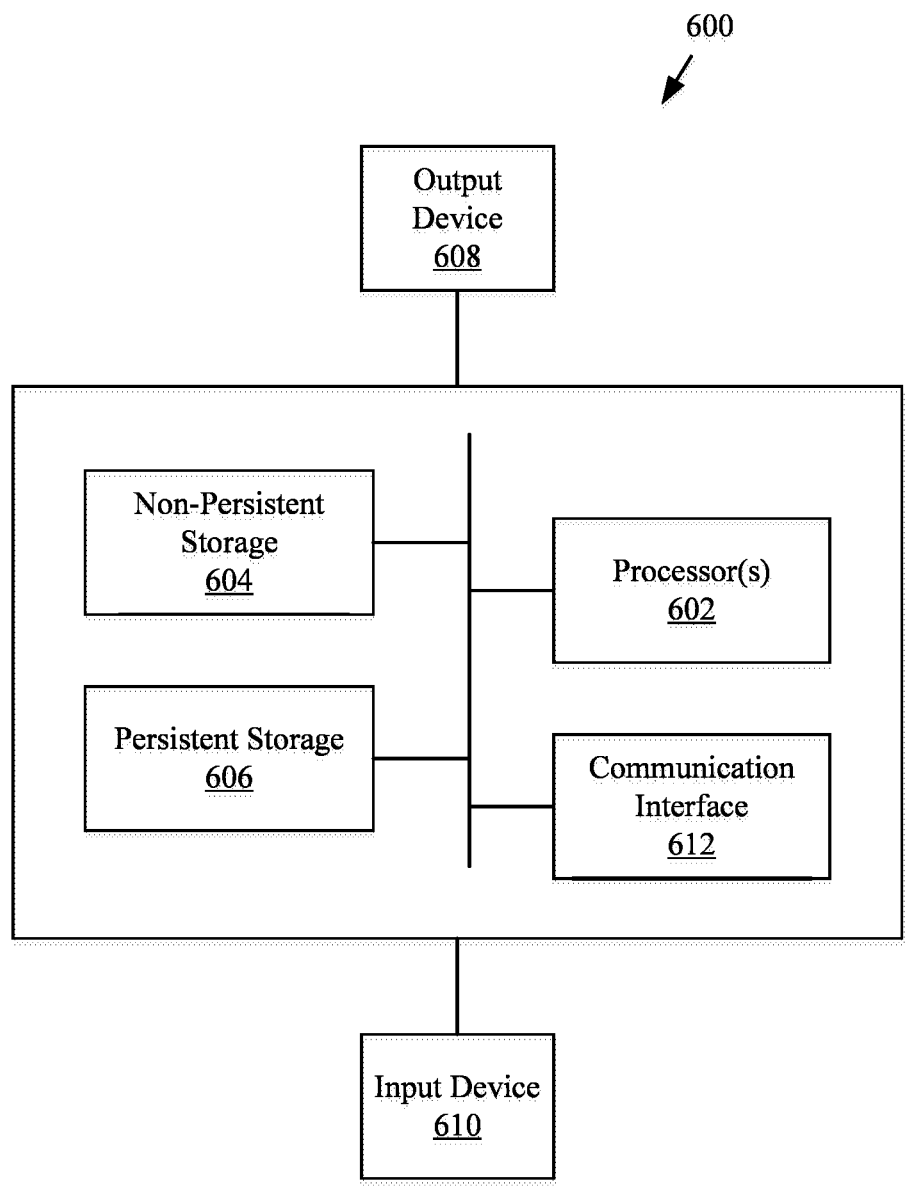
FIG. 6 shows a computing system in accordance with one or more embodiments of the invention.

In one or more embodiments of the invention, the production hosts (e.g., 110A-110N) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the production hosts (e.g., 110A-110N) described throughout this application.

In one or more embodiments of the invention, the system includes a dynamic strategizer (130). The dynamic strategizer (130) includes an application relationship mapper (132), a checker (134), and a replicator (136). The dynamic strategizer (130) can contain more or less parts without departing from the invention. Alternatively, the individual parts (132, 134, and 136) can be standalone components and not associated with the dynamic strategizer (130).

The dynamic strategizer (130), functions to determine when a migration is to take place and/or other kind of maintenance and determine which parts of the system should be placed in a maintenance mode and/or moved to an external environment. It can also schedule a migration and alert a user or administrator when a migration/application malfunctions or fails.

In one or more embodiments of the invention, the dynamic strategizer (130) includes an application relationship mapper (132). The application relationship mapper (132) determines the relationship between individual applications that are to be migrated. Based on this determination the dynamic strategizer, along with the checker and replicator, can determine which applications are related to a particular application that is to be migrated or placed in maintenance. By determining which applications as well as associated computing components such as storage devices are related, appropriate test can be performed to ensure that post migration (or other maintenance) the application, related applications, and their associating computing devices have been restored to an adequate level the functioning. If so, they can be brought back online at the local environment. The local environment, for example, may be the original production host (e.g., 110A) or a different production host that the applications have been migrated to (e.g., 110N). Otherwise, the replicator (136), which will be described later, will replicate the affected applications in an external environment, such as a cloud environment and/or an edge environment.

In one or more embodiments of the invention, the application relationship mapper (132) determines the relationships between an application to be migrated and other applications. The relationship, in one or more embodiments of the invention, can be determined by port mapping, such as looking at port mapping meta-data or the actual internal system traffic on various ports. By analyzing whether traffic on a specific port is outgoing or incoming, the relationship mapper or other equivalent structure can determine when the application is the parent node, and which is the child node. The independent application in a system would be a parent and the dependent application would be the child. The child or dependent application would be considered to have an IS-A relationship with the parent.

In one or more embodiments of the invention, the application relationship mapper (e.g., 132), finds multiple applications with the same system access to the same data paths and location. In this case, the application relationship mapper (e.g., 132) determines that the two applications have a HAS-A relationship. This can be determined by the application relationship mapper by looking at meta-data for the particular data path and or a registration ID that is common to at least two applications. Other means for identifying both a HAS-A relationship and/or IS-A relationship can be used, without departing from the invention.

The checker (134), as will be described in more detail with regards to the methods shown in FIGS. 3-5, sends messages such as, but not limited to, a ping to each previously offline or migrated application as well as any applications or devices that host or are related to the offline or migrated application. The related applications or devices may be determined based on analysis of logs or configuration files, or, in one or more embodiments of the invention, by an application relationship mapper (e.g., 132) described above.

In one or more embodiments of the invention, the checker (e.g., 134) and/or application relationship mapper (132), determines the relationships between the application(s) that are to be tested by the checker (e.g., 134) and other applications or components of the system. Other components of the system may include, but are not limited to, storage locations, such as storage devices that contain the application and/or related data such as the data for a database. The components may also include the physical computational devices that serve as hosts for the application and/or related applications.

The application(s) to be tested by the checker (e.g., 134) and the other applications and components that are related to it, are not necessarily located on the same production host (e.g., 110A) or even the same source device. The application relationship mapper (e.g., 132) or other component of the dynamic strategizer (130) analyzes traffic on both ports internal to the source production host (e.g., 110A) and individual production hosts (e.g., 110A-110N) and other external devices that are connected by a local network and/or Internet, such as cloud and edge environments.

The checker (134) sends messages such as, but not limited to, a ping to the application(s) and/or the underlying physical computational devices that host them to determine if they are responsive. If the application and related applications and components are found to be responsive, the checker (134) compares each application and component's response times to determine if the connections between the application(s) and related applications and/or components meet a desired level of performance (such as a threshold amount or percentage of change).

In one or more embodiments of the invention, the checker (134) compares the response times determined in previous messages to the application, its underlying physical computational devices that host it, related applications and their host, and other related computational devices, and the current response time to determine how much they differ. In one or more embodiments of the invention, if the difference is within a predetermined threshold such as but not limited to a percentage (for example, 5%, 10%, or any other preset percentage), then the checker (134) may determine that the application and/or component is functioning appropriately and may be brought online and/or taken out of maintenance mode.

However, if the checker (134) determines that one or more applications and/or components do not pass the check (i.e. a return message takes longer than a threshold period of time, or is not received at all), then the checker notifies a user, administrator and/or other appropriate entity (such as, but not limited to, an automated system for reversing a migration, a manufacturer, etc.) that the application and/or related applications and devices are not functioning appropriately. The notified entity may then perform actions to ameliorate the problem, such as, but not limited to, reversing a migration, manually placing the application online, replacing hardware, or any other action, as is appropriate. In one or more embodiments of the invention, the checker (134) may also provide and send any other useful information collected for correcting the problem to the notified entity, such as, but not limited to, the number of hops, system telemetry, and other useful information, as appropriate. The application(s) being checked by the checker (e.g., 134) as well as related applications and components are left in a maintenance mode and/or off-line.

When the checker (134) determines that the one or more applications and/or related components did not pass the check, the replicator (136), moves the application's instance to an external environment, so that the application remains available to a user, even if it is at a reduced performance. The external environment can comprise of such environments as a so-called cloud environment or edge environment. By replicating the original instance of the application on the production host (e.g., 110A), to the external environment, the administrator or other entity may have sufficient time to correct the problem(s) causing the application to fail the connection test performed by the checker (e.g., 134).

In one or more embodiments of the invention, periodically, as described in more detail below with regards to the methods shown in FIGS. 3-5, the checker (134) sends out additional test messages to the local computational devices (such as, but not limited to, local production hosts (e.g., 110A-110N). These additional test messages are to determine if the problems previously detected by the checker (134) during the connection test have been resolved. If they have been resolved, the application is loaded on the local environment, and the application's instance is moved back to the local environment from the external environment by the replicator (e.g., 136) or other similar component of the system.

In one or more embodiments of the invention, the dynamic strategizer (130) and its associated modules (e.g., 132-136) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the dynamic strategizer (130) described throughout this application.

While FIG. 1 shows a configuration of components, other configurations may be used without departing from the scope of embodiments described herein. For example, although FIG. 1 shows all components as part of two devices, any of the components may be grouped in sets of one or more components which may exist and execute as part of any number of separate and operatively connected devices. Accordingly, embodiments disclosed herein should not be limited to the configuration of components shown in FIG. 1.

Figure 2:
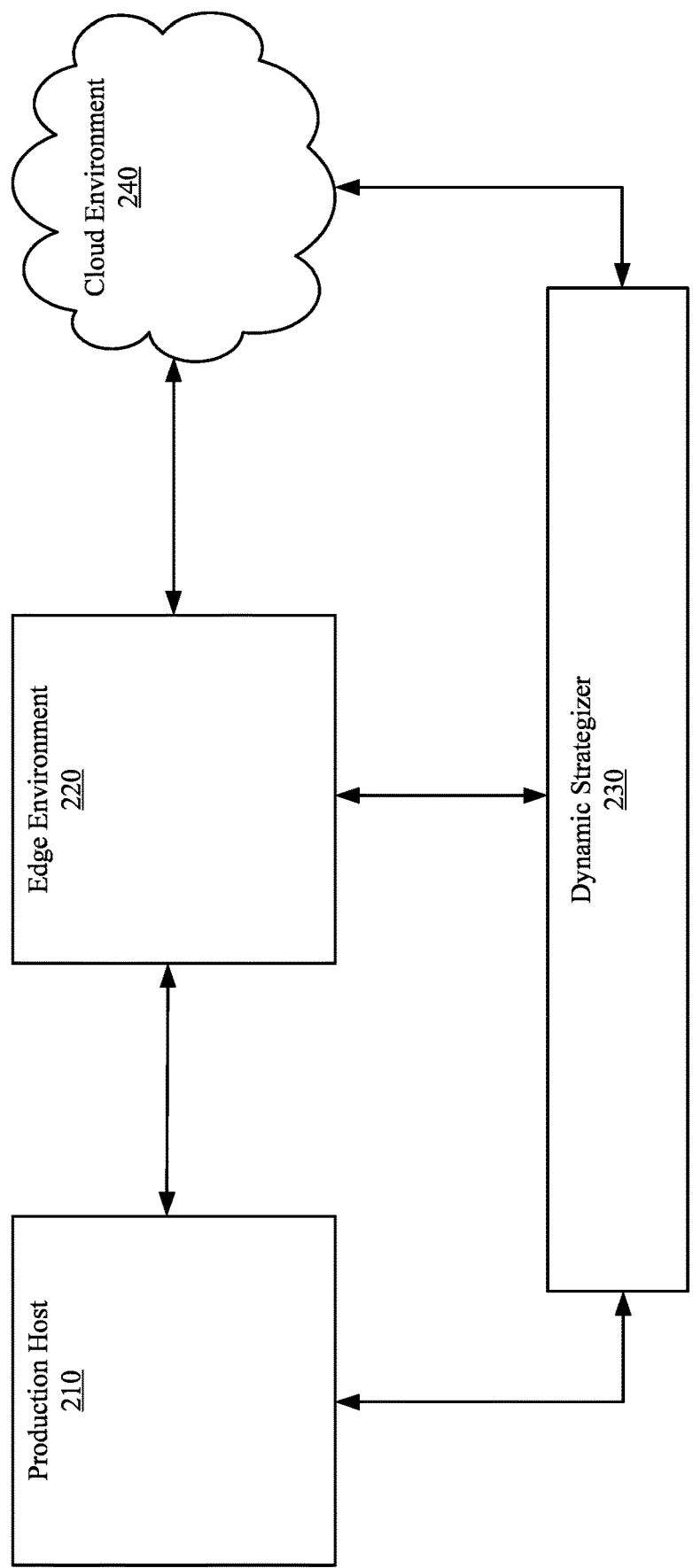
FIG. 2 shows a diagram of a system that includes cloud and edge environments, in accordance with one or more embodiments of the invention.

FIG. 2 shows a diagram of a system that includes cloud and edge environments, in accordance with one or more embodiments of the invention. The system includes at least one production host (210), an edge environment (220), a cloud environment (240), and a dynamic strategizer (230) in accordance with one or more embodiments described herein. For simplicity, the system shown in FIG. 2 only shows one production host (210), however this is only representative of a subset of the system, and the system can include a plurality of production hosts (e.g., 110A-110N, FIG. 1).

The local production host (e.g., 210) is similar to the production hosts (e.g., 110A-110N) described above with regards to FIG. 1. As described above, the local production host (e.g., 210) host one or more applications and other processes. The local production hosts (e.g., 210) include one or more processors and other computing devices such as storage devices.

The local production host (e.g., 210) may include storage devices (not shown) for storing data. The storage devices may be physical storage devices and/or logical storage devices. The physical storage devices may include any combination of hard disk drives, solid state disk drives, tape drives, and/or any other physical storage mediums for the storage of data. The logical storage devices (e.g., virtualized storage) may utilize any quantity of hardware storage resources of any number of computing devices for storing data. For example, the logical storage device may utilize portions of any combination of hard disk drives, solid state disk drives, tape drives, and/or any other physical storage medium of any number of computing devices.

The local production host (e.g., 120) may additionally be connected through a network (not shown) such as the Internet, to one or more edge environments (e.g., 220) and/or cloud-based storage environments (e.g., 240). Both the edge (e.g., 220) and cloud-based storage environments (e.g., 240) may be public or private (such as an internal or corporate cloud run by the owner of the production host (e.g., 210).

In one or more embodiments of the invention, the network allows the local production host (e.g., 210) to communicate with the external environment(s) (edge environment (e.g., 220) and cloud environment (e.g., 240)) as well as other hosts, systems, clients (not shown), and the dynamic strategizer (230). The various components of the local production host (210) may also communicate with each other through a network. The network may be a high-speed internal network and/or include part of an external network.

A network may refer to an entire network or any portion thereof (e.g., a logical portion of the devices within a topology of devices). A network may include a data center network, a wide area network (WAN), a local area network (LAN), a wireless network, a cellular phone network, and/or any other suitable network that facilitates the exchange of information from one part of the network to another. A network may be located at a single physical location or be distributed at any number of physical sites. In one or more embodiments, the network may be coupled with or overlap, at least in part, with the Internet.

In one or more embodiments, the network may include any number of devices within any of the components of the system. In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, a router, a multilayer switch, a fibre channel device, an InfiniBand® device, etc. A network device is not limited to the aforementioned specific examples.

The network may connect the local production host (e.g., 210) to either or both of an edge environment (e.g., 220) and a cloud environment (e.g., 240). The network may also connect the dynamic strategizer (e.g., 230) or any of its internal or related components (see FIG. 1), to any or all of the local production host (e.g., 210), the edge environment (e.g., 220), and the cloud environment (e.g., 240). The network can connect more or less components then shown in FIG. 2 without departing from the invention.

The dynamic strategizer (230) as described in more detail above, controls which environment an instance of an application (or its context) is presently active at. As described below with regards to the methods shown in FIG. 3-5, in one or more embodiments of the invention, when an instance of the application is offline, the dynamic strategizer (230) moves the application from the production host (e.g., 210) to either the edge-based environment (e.g., 220) and/or the cloud environment (e.g., 240).

The cloud-based environment (e.g., 240) may be public or private (such as an internal or corporate cloud run by the owner of the production host (e.g., 210)). The cloud-based storage environment (e.g., 240) can comprise of servers including host and internet-based storage. When the cloud-based storage environment is not commonly owned by the owner of the local production host (e.g., 210), the provider of the cloud-based storage environment provides different level of service and storage at different prices.

The edge-based environment (e.g., 220) is in general a computing environment in between the cloud-based environment (e.g., 240) and the local production host (e.g., 210). The edge-based environment typically provides for better performance than the cloud environment, however there is a limit in how much can be hosted compared to the cloud-based environment. While it might be ideal to host the application on the edge environment, other related components, such as the database data, may be better to be placed in the cloud-based environment for a variety of reasons.

Since the cloud-based environment is farther from a local user, it may not provide the level of service that the users are used to on their local production hosts. Accordingly, the dynamic strategizer (230) has to consider price, level of service, and other factors when deciding where to host an application and/or its related applications and data when the local production host (e.g., 210) fails the connection test. The preferences and choice for where to host the application can be predetermined based on a configuration by an administrator, user, or even a manufacturer and can consider a variety of preferences and decision making.

For example, in a non-limiting example, if the problem is a simple problem that should not take long to fix, it may be desirable to host it on the edge environment. However, if the problem is expected to take several days to correct, then the cloud environment may be more ideal. Other reasons and combinations of choosing between the edge and cloud environments can be made, including those made due to the price of hosting the application, the speed of one or the other, security, storage capacity, if the application is for internal use (such as an HR program etc.) or external use (e.g., a website) and/or other criteria.

While FIG. 2 shows a configuration of components, other configurations may be used without departing from the scope of embodiments described herein. For example, although FIG. 1B shows all components as part of two devices, any of the components may be grouped in sets of one or more components which may exist and execute as part of any number of separate and operatively connected devices. Accordingly, embodiments disclosed herein should not be limited to the configuration of components shown in FIG. 2.

Figure 3:
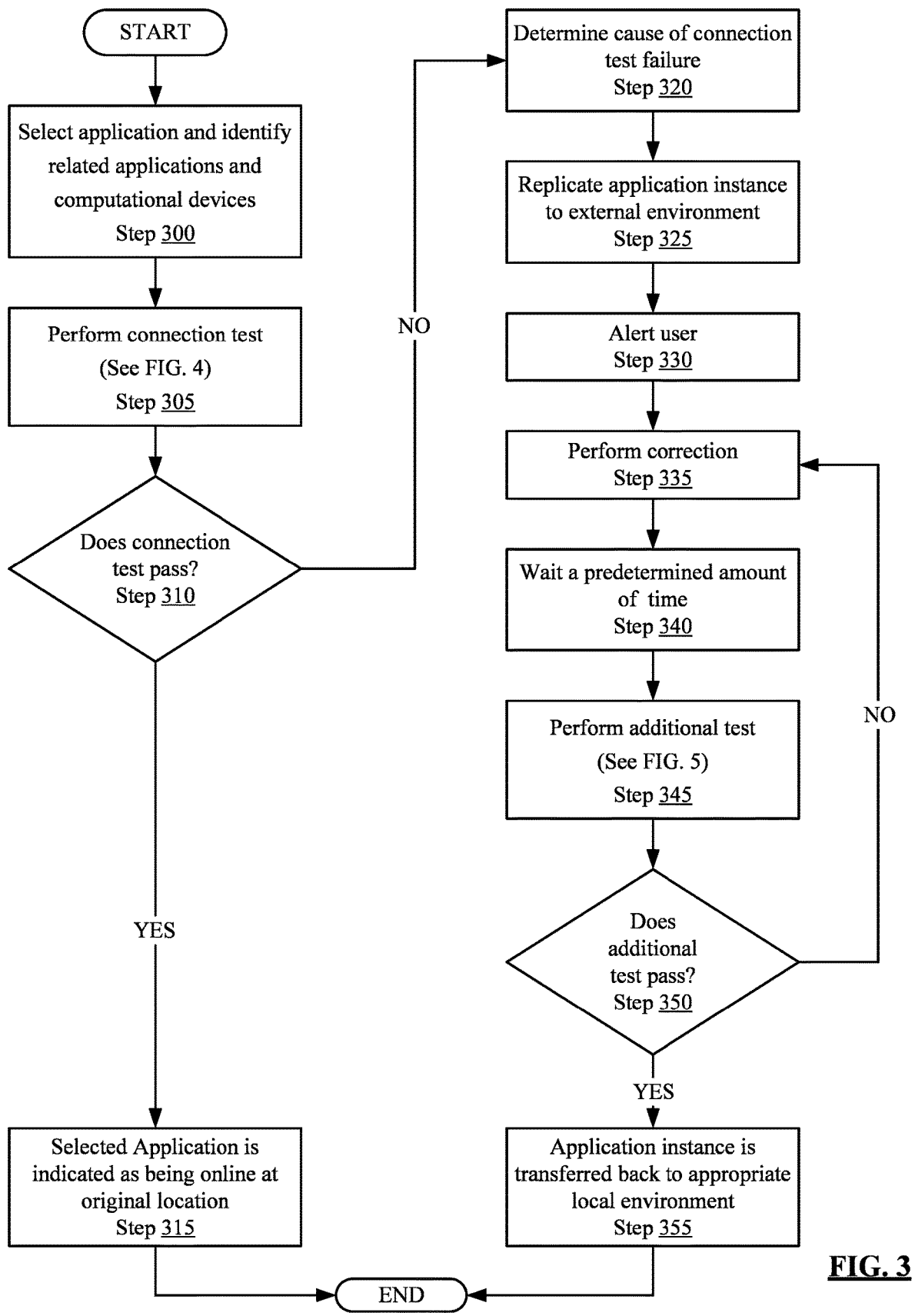
FIG. 3 shows a flowchart of a method for determining if an application is functioning and taking mitigating actions if not in accordance with one or more embodiments of the invention.

FIG. 3 shows a flowchart describing a method for detecting and correcting an application and/or other computing device that has failed. In one or more embodiments of the invention, the method can be performed on an application that is being migrated. However, the connection test and subsequent replicating and corrections do not necessarily have to be performed on applications that have been migrated, and in one or more other embodiments of the invention, may be performed on any application that might have failed, such as, but not limited to, an application that has had maintenance performed on it or the production host.

The method may be performed, for example, by the dynamic strategizer (e.g., 130, FIG. 1) and/or any other part of the production hosts (e.g., 110A-110N, FIG. 1). Other components of the system, including those illustrated in FIG. 1 perform all, or a portion of the method of FIG. 3 without departing from the invention. While the method describes the connection tests being performed on specific applications, the test may be directed towards the underlying computing devices which host the applications and not necessarily the applications themselves. While FIG. 3 is illustrated as a series of steps, any of the steps may be omitted, performed in a different order, additional steps may be included, and/or any or all the steps may be performed in a parallel and/or partially overlapping manner without departing from the invention.

In Step 300, the method selects an application(s) and identifies related applications and computation devices. The selected application may be any application that has been taken off-line or otherwise placed in a maintenance mode. In one or more embodiments of the invention, the application may have been placed in a maintenance mode due to being migrated. In Step 300, the dynamic strategizer (e.g., 130, FIG. 1) or other related component, also determines related applications and components, such as storage locations and network hops, that the application being tested is dependent on, as well as any other related applications and/or devices that a configuration of the connection test includes.

Once the application(s) the method is to be performed on is selected as well related applications and components are determined in Step 300, the method proceeds to Step 305, where the dynamic strategizer (e.g., 130, FIG. 1) and specifically the checker (e.g., 134, FIG. 1) performs a connection test of the application(s) (and/or underlying computing devices) that have been selected in Step 300. In one or more embodiments, the checker (e.g., 134, FIG. 1) sends messages between each of the applications and/or their underlying computational components which host the applications and those applications/components that are related to the selected applications. The messages are to determine if a response has been received and to determine response times for comparison with previous response times (such as those in a non-limiting example, obtained pre-migration). The method of performing the connection test is described in more detail below with regards to the method shown in FIG. 4. Other methods for performing the connection test may be used, and the invention is not limited to the method described in FIG. 4.

Once the checker or other appropriate component, performs the connection test, the method proceeds to Step 310, where it is determined if the connection test is passed. If the connection test is passed or successful (meaning communication has been restored between the migrated application(s) and all related application(s) and component(s) at least within a predetermined threshold of a performance level), then the method proceeds to Step 315 where the application is then indicated to be online and available to users. The method then ends after Step 315.

However, if the connection test does not pass in Step 310, the method proceeds to Step 320. In Step 320, the method determines a cause of the connection test failure. This may be as simple as identifying which of the applications, related applications, and computing devices that host the applications and their data have failed to respond at least within a threshold amount of time. The method may also include analyzing system telemetry and other data as appropriate to determine where the failure (possibly) is located. In one or more embodiments of the invention, Step 320 may optionally not be performed or may be performed at a different time (such as by a user in Step 330) and the method proceeds directly to Step 325.

Once the potential cause of the connection test failure is identified in Step 320 the method proceeds to Step 325. In Step 325, the replicator (e.g., 136, FIG. 1) or similar component, replicates the application or applications related to or affected by the failure in an external environment. The replication of the application (also referred to as application context and application instance) includes replicating the state of the application instance that is currently executing on the local production host. In this manner, the users can continue to interact with the application instance on the external environment as-if they were still operating the application instance on the local production host.

In one or more embodiments of the invention, this external environment may take the form of a cloud environment or edge environment. As discussed above, the choice of which environment to replicate an instance the application(s) can be based on a plethora of factors. These factors may be predetermined by an administrator or manufacture or may be based entirely on machine learning or other automated processes.

Once the instance or context of the application in Step 325 has been replicated to the external environment, or concurrently with the replication, the users (or other applications) can continue to interact/utilize the replicated applications in the external environment while the method proceeds to Step 330 where a user, administrator, and/or other concerned party are alerted that the connection test failed. This alert, in one or more embodiments of the invention, may include sending data, such as the results of the messages sent during the connection test in Step 305, as well as any other useful information and/or telemetry. The user, administrator, and/or other concerned party may perform appropriate actions in Step 335 to ameliorate the failure so that the application that was migrated and those that are dependent on it may be restored.

In one or more embodiments of the invention, the user, administrator, and/or other concerned party takes appropriate action in Step 335 to correct the problem identified in Step 320. In one or more other embodiments of the invention, the user, administrator, and/or other concerned party determines the cause of the connection test failure while performing the correction. Other combinations and orders of Steps 320-335 may be performed without departing from the invention.

The correction performed in Step 335 can take many forms and is specific to the particular applications, underlying computation devices, and or other related components that are affected either directly or indirectly by the failure. In the case of a failed migration, this may comprise of reversing the migration or manually restoring the connections. Other means of correcting the cause of the connection test failure can be performed such as replacing underlying computation devices/hardware, rebooting systems, etc.

The method then, in Step 340, waits a predetermined amount of time to allow a user, administrator, or other entity to repair or restore connections between the application(s), such as a migrated application and/or an underlying computing device that hosts it, and its related applications and components in Step 335. This predetermined amount of time may be an amount of time configured by a user, administrator, or manufacture when the system is initiated or manufactured. For example, the administrator may estimate that all such repairs after a migration would potentially take one hour or other greater or lesser amount of time as appropriate. Alternatively, the dynamic strategizer (e.g., 130, FIG. 1) or related component may use an algorithm to determine the average amount of time that a specific problem should take to be corrected.

Once the method waits the predetermined time in Step 340, the method proceeds to Step 345, where the dynamic strategizer (e.g., 130, FIG. 1) and specifically the checker (e.g., 134, FIG. 1) performs an additional test on the application(s) (and/or underlying computing devices) that have been determined in Step 305 to have failed the connection test. In one or more embodiments, the checker (e.g., 134, FIG. 1) sends messages between each of the applications and/or underlying computation devices that host them, and those applications/components that are related to them to determine if they are responsive and to determine the underlying response times. The method of performing the additional test is described in more detail below with regards to the method shown in FIG. 5. Other methods for performing the additional test may be used, and the invention is not limited to the method described in FIG. 5.

Once the additional test is performed in Step 345, the method proceeds to Step 350. In Step 350, the method determines if the applications and/or underlying hardware, as well as related applications and components, pass the additional step in 345. If they pass, the method proceeds from Step 350 to Step 355, where the application instance is transferred back from the external environment to the appropriate local environment. The appropriate local environment may be the original production host (e.g., 110A) that hosted the application prior to its failure or being placed in a maintenance mode, or can be any other production host (e.g., 110N), that is appropriate either due to a migration or the placement of the application by a user, administrator, or other entity. In one embodiment of the invention, a copy of the entire application instance on the external environment (including all related state) is transferred to the local production host. In another embodiment of the invention, only the state of the application instance on the external environment is transferred to the local production host. The transfer in step 355 is intended to be performed in a manner that appears to be seamless to the users.

After the application is restored in Step 355, the method ends.

If, however, the additional test performed in Step 345, does not pass in Step 350, the method returns to Step 335. In Step 335, the application and/or underlying hardware, as well as related application and components can continue to be repaired. Steps 335-350 repeat until either the cause of the connection test failure identified in Step 320, is corrected, or until the user, administrator, or other entity takes other actions (such as, but not limited to, eliminating the application).

The method may end after either steps 315 or 355.

Figure 4:
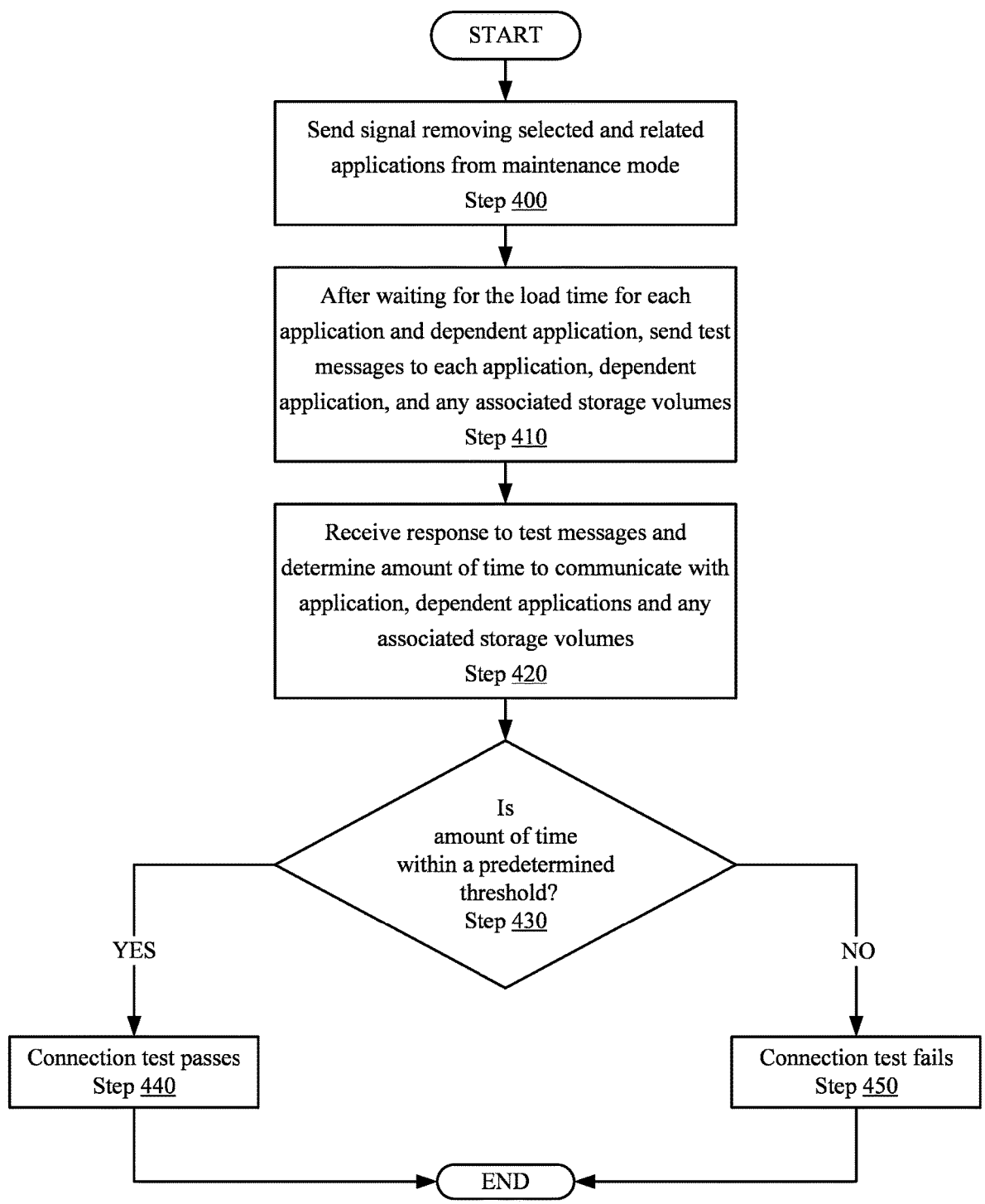
FIG. 4 shows a flowchart of a method for performing a connection test in accordance with one or more embodiments of the invention.

FIG. 4 shows a flowchart describing a method for performing a connection test in accordance with one or more embodiments disclosed herein. This method may be performed on its own or as part of Step 305 of the method of FIG. 3. The method may be performed by, for example, the checker (e.g., 134, FIG. 1) and/or any other part of the system shown in FIG. 1. Other components of the system illustrated in FIG. 1 and/or in addition to those shown in FIG. 1, may perform all, or a portion of the method of FIG. 4 without departing from the invention.

While FIG. 4 is illustrated as a series of steps, any of the steps may be omitted, performed in a different order, additional steps may be included, and/or any or all the steps may be performed in a parallel and/or partially overlapping manner without departing from the invention.

In step 400, the checker (e.g., 134, FIG. 1) or other related components of the system, sends a signal or message to remove the selected application(s) from a maintenance mode or other mode where the applications and related applications are offline. The selected applications, in one or more embodiments of the invention, may be in a maintenance mode due to being migrated. Alternatively, the applications may be in a maintenance mode due to periodic or required maintenance, including when an application has previously failed a connection test. The application(s) may be offline or in a maintenance mode for other reasons without departing from the invention.

Once the checker (e.g., 134, FIG. 1) or related component sends the signal in Step 400, the method proceeds to Step 410. The method waits a predetermined time to load for each application, dependent application, and/or dependent component. Once sufficient time has passed for the applications and/or components to load, the checker (e.g., 134, FIG. 1) sends a test message to each of the selected applications (and/or the underlying computing devices that host them) as well as the related applications, components, and intermediatory connections. In one or more embodiments of the invention, this is done by sending a message to the selected applications, which then forwards a message to each related application and component. Alternatively, in one or more embodiments of the invention, messages may be sent directly from the checker (e.g., 134, FIG. 1) to each application, component, and any intermediatory connections and/or hops. The message in one or more embodiments of the invention may take the form of a ping. Other methods of sending messages to each application and/or component, as well as other forms of messages may be used without departing from the invention.

Once all the applications and related components receive the one or more messages from the checker (e.g., 134, FIG. 1), they send a response message. The response is received in Step 420 and the time it takes to communicate with the migrated application as well as each application or component that is related to it may be determined. Other information such as the number of network hops or other telemetry may be also received, which may be used for any future maintenance purposes. Once a sufficient time has passed to receive the response, the method proceeds to step 430.

In Step 430, the checker (e.g., 134, FIG. 1) or other related component compares the amount of time it takes to communicate with the selected application(s) as well as each application or component with previous times and a predetermined threshold. The checker (e.g., 134, FIG. 1) in one or more embodiments calculates a difference between previous response times and the current response times and compares it with the predetermined threshold.

For example, in a non-limiting example, if an application has been migrated and took 20 ms to communicate with a database during a pre-migration check but during the post-migration check took 25 ms, the difference would be 5 ms equating to a 25% increase. The difference may be positive or negative, and a different difference may be given for each application and component. In another non-limiting example, suppose an intermediatory application that the migrated application is dependent on, during the pre-migration check takes 5 ms to respond but during the post-migration check takes 6 ms, then the difference for this component is 1 ms equating to a 20% increase.

In one or more embodiments of the invention, the threshold may be a predetermined difference in time or a percentage change in the amount of time. This threshold may be predetermined by a user, administrator, manufacturer, and/or other concerned party. The predetermined threshold may be a universal threshold for all such connection tests and/or migrations or could be set for the specific maintenance and/or migration currently being performed (for example, it might be desirable to have a migration to a cloud environment to have a much higher threshold than a migration to a different host in the same information handling system).

If the difference in communication time for the selected application(s) being tested such as those that have been migrated, and all of the related applications and components is less than the threshold, the method proceeds to Step 440, where the connection test is considered to have passed or been successful, and the method ends. Otherwise, if the difference for any of the tested/migrated applications, related applications, and/or related components is greater than the threshold, or no response was received at all in Step 420, the method proceeds from Step 430 to Step 450, where the migration is indicated/considered to have failed or been unsuccessful, and the method ends.

Using the previous example, where the difference is 5 ms and 1 ms. If the threshold is 30% increase, then the connection test would be considered to have passed. However, if the threshold is 21%, even though the intermediatory application passed, because the response time for the database increased by 25%, the connection test would be considered to have failed. Other percentages or difference may be used without departing from the invention and the above values are only examples and not necessarily representative of real values.

Once either Step 440 or 450 is complete, the method may end.

Figure 5:
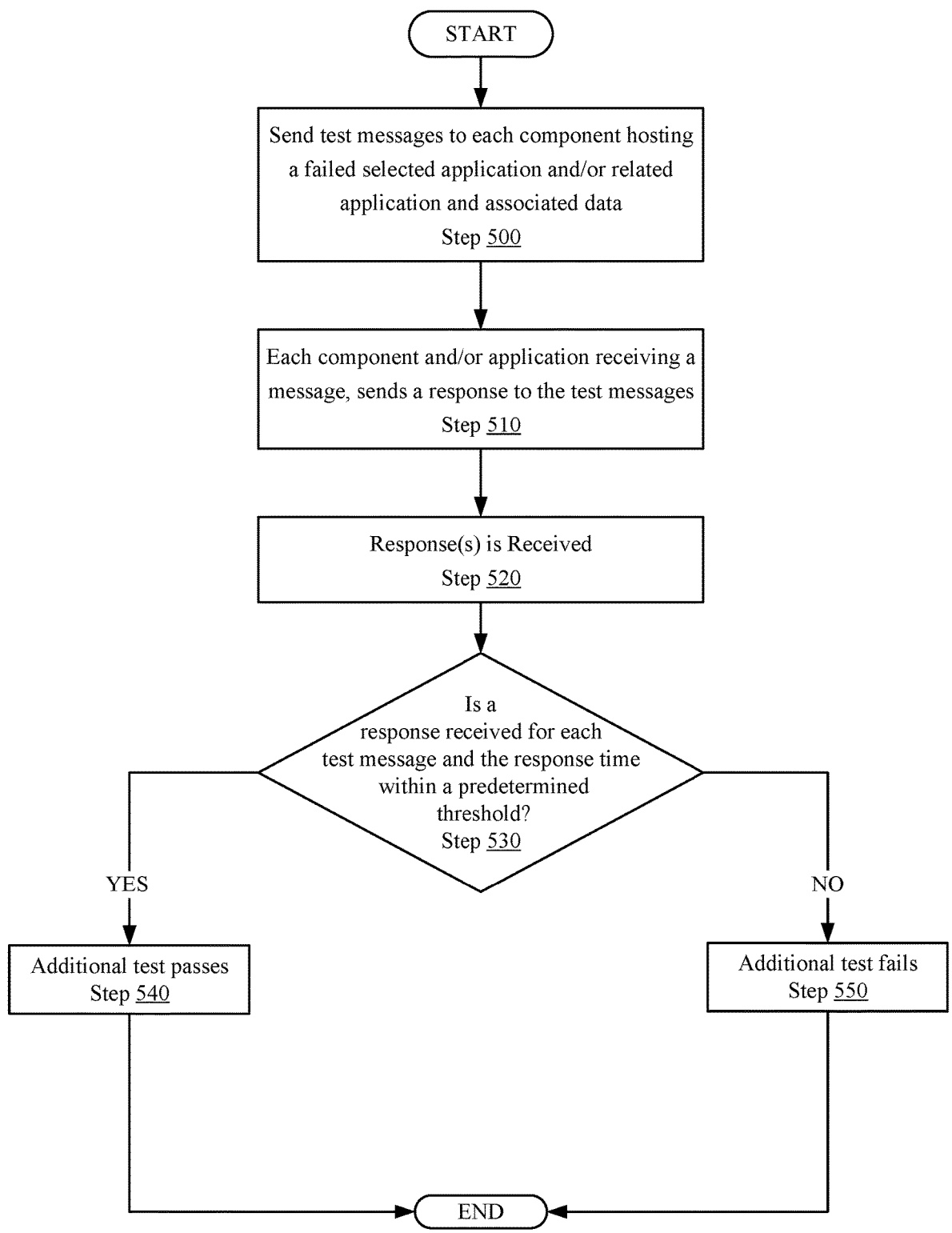
FIG. 5 shows a flowchart of a method for performing an additional test in accordance with one or more embodiments of the invention.

FIG. 5 shows a flowchart describing a method for performing an additional test in accordance with one or more embodiments disclosed herein. This method may be performed on its own or as part of Step 345 of the method of FIG. 3. The method may be performed by, for example, the checker (e.g., 134, FIG. 1) and/or any other part of the system shown in FIG. 1. Other components of the system illustrated in FIG. 1 and/or in addition to those shown in FIG. 1, may perform all, or a portion of the method of FIG. 5 without departing from the invention.

While FIG. 5 is illustrated as a series of steps, any of the steps may be omitted, performed in a different order, additional steps may be included, and/or any or all the steps may be performed in a parallel and/or partially overlapping manner without departing from the invention.

In Step 500, the checker (e.g., 134, FIG. 1) or other related components of the system, sends a test message to each of the computational devices which host the applications and/or related applications and data that failed the previous connection test (e.g., 305, FIG. 3). In one or more embodiments of the invention, this is done by sending a message to the computation devices which host the applications (and/or the applications that are in a maintenance or hibernating mode which can still respond to system messages), which then forwards a message to each related or connected computation device and/or application. Alternatively, in one or more embodiments of the invention, messages may be sent directly from the checker (e.g., 134, FIG. 1) to each application, component, and any intermediatory connections and/or hops. The message, in one or more embodiments of the invention, may take the form of a ping. Other methods of sending messages to each application and/or component, as well as other forms of messages may be used without departing from the invention.

Once all the applications and/or their underlying computational components receive the one or more messages from the checker (e.g., 134, FIG. 1), they send a response message. The response is received in Step 520, and the time it takes to communicate with the underlying computation components that host the selected applications and/or related applications and data may be determined. Other information, such as the number of network hops or other telemetry, may be also received, which may be used for any future maintenance purposes. Once a sufficient time has passed to receive the response, the method proceeds to Step 530.

In Step 530 the checker (e.g., 134, FIG. 1) or other related component compares the amount of time it takes to communicate with the selected application, and each related application's underlying computational device that hosts the applications and/or their data, to determine if the application or underlying computation device is responsive and responds within a predetermined threshold of time. The checker (e.g., 134, FIG. 1), in one or more embodiments, calculates a difference between previous response times and the current response times and compares it with the predetermined threshold.

In one or more embodiments of the invention, the threshold may be a predetermined difference in time, or a percentage change in the amount of time. This threshold may be predetermined by a user, administrator, manufacturer, and/or other concerned party. The predetermined threshold may be a universal threshold for all such connection tests and/or migrations or could be set for the specific maintenance and/or migration currently being performed (for example, it might be desirable to have a migration to a cloud environment to have a much higher threshold than a migration to a different host in the same information handling system).

If the underlying computational device hosting the application(s) and related applications and data responds within the predetermine time, the method proceeds to Step 540 where the additional test is considered to have passed and/or been successful and the method ends. Otherwise, if the response is not received or not received within the predetermine threshold of time, the method proceeds to Step 550 where the migration is indicated/considered to have failed and the method ends.

Once either Step 540 or 550 is complete, the method may end.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many diverse types of computing devices exist, and the aforementioned input and output device(s) may take other forms.

In general, embodiments described above relate to methods, systems, and non-transitory computer readable mediums storing instructions for moving an application context (also referred to as an application instance) to an external environment, such as a cloud or edge environment. The application context is moved to the external environment when the context does not respond to a test message or responds in such a way that indicates a less than desired performance.

By placing the application in an external environment, such as a cloud or edge environment, the system in accordance with one or more embodiments of the invention can ensure that critical applications can continue to function (i.e., users can still use these critical applications) even during maintenance (or migration) if the maintenance (or migration) initially fails. The method, in accordance with one or more embodiments of the invention, then continues to periodically test the local environment to determine if the local copy of the application and/or the underlying computational device hosting it, has been repaired. If so, the application's instance can be moved back to the local environment, so that a user does not encounter significant downtime and/or reduced performance.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments may be devised which do not depart from the scope of embodiments as disclosed herein. Accordingly, the scope of embodiments described herein should be limited only by the attached claims.

What is claimed is:

1. A method for maintaining availability of an application, the method comprising:
    performing a connection test of an application located on a local production host;
    making a first determination, based on the connection test, that the connection test failed;
    replicating, after the first determination, the application to an external environment, separate from the local production host, to obtain a replicated application, wherein the replicated application is configured to continue receiving interaction from a user while the application on the local production host is being repaired;
    determining a cause of the connection test failure;

correcting, after determining the cause of the connection test failure, the cause of the connection test failure;
performing, after correcting the cause of the connection test failure, an additional test to determine if the cause of the connection test failure has been corrected;
making a second determination, based on the additional test, that the cause of the connection test failure has been corrected; and
transferring, in response to the second determination, the replicated application from the external environment to the local production host to restore the application on the local production host, wherein transferring the replicated application results in at least a state of the replicated application being transferred to the local production host.

2. The method of claim 1, wherein the external environment is an edge environment.

3. The method of claim 1, wherein the external environment is a cloud environment.

4. The method of claim 1, wherein when the connection test fails, prior to correcting the cause of the connection test, a user is notified.

5. The method of claim 4, wherein the additional test is performed after the user is notified and a predetermined period of time has passed since the connection test failed.

6. The method of claim 1, wherein the connection test is also performed on all applications that are related to the application and if the connection test fails on at least one of all the applications that are related to the application, the connection test is considered to have failed for the application.

7. The method of claim 6, wherein when the connection test fails, the application and all the applications that are related to the application have their context moved to the external environment.

8. The method of claim 6, wherein only the application and only those applications of all the applications that are related to the application that have failed the connection test are transferred to the external environment.

9. A non-transitory computer readable medium comprising computer readable program code, which when executed by a computer processor enables the computer processor to perform a method for performing a method for maintaining availability of an application, the method comprising:
performing a connection test of an application located on a local production host;
making a first determination, based on the connection test, that the connection test failed;
replicating, after the first determination, the application to an external environment, separate from the local production host, to obtain a replicated application, wherein the replicated application is configured to continue receiving interaction from a user while the application on the local production host is being repaired;
determining a cause of the connection test failure;
correcting, after determining the cause of the connection test failure, the cause of the connection test failure;
performing, after correcting the cause of the connection test failure, an additional test to determine if the cause of the connection test failure has been corrected;
making a second determination, based on the additional test, that the cause of the connection test failure has been corrected; and
transferring, in response to the second determination, the replicated application from the external environment to the local production host to restore the application on the local production host, wherein transferring the replicated application results in at least a state of the replicated application being transferred to the local production host.

10. The non-transitory computer readable medium of claim 9, wherein the external environment is an edge environment.

11. The non-transitory computer readable medium of claim 9, wherein the external environment is a cloud environment.

12. The non-transitory computer readable medium of claim 9, wherein when the connection test fails, prior to correcting the cause of the connection test, a user is notified.

13. The non-transitory computer readable medium of claim 12, wherein the additional test is performed after the user is notified and a predetermined period of time has passed since the connection test failed.

14. The non-transitory computer readable medium of claim 9, wherein the connection test is also performed on all applications that are related to the application and if the connection test fails on at least one of all the applications that are related to the application, the connection test is considered to have failed for the application.

15. The non-transitory computer readable medium of claim 14, wherein when the connection test fails, the application and all the applications that are related to the application have their context moved to the external environment.

16. The non-transitory computer readable medium of claim 14, wherein only the application and only those applications of all the applications that are related to the application that have failed the connection test are transferred to the external environment.

17. A system comprising:
at least one local production host that hosts a plurality of applications which comprises:
at least one processor;
a storage device; and
at least one memory that includes instructions, which when executed by the processor, performs a method for maintaining availability of an application, the method comprising:
performing a connection test of an application located on the at least one local production host;
making a first determination, based on the connection test, that the connection test failed;
replicating, after the first determination, the application to an external environment, separate from the local production host, to obtain a replicated application, wherein the replicated application is configured to continue receiving interaction from a user while the application on the local production host is being repaired;
determining a cause of the connection test failure;
correcting, after determining the cause of the connection test failure, the cause of the connection test failure;
performing, after correcting the cause of the connection test failure, an additional test to determine if the cause of the connection test failure has been corrected;
making a second determination, based on the additional test, that the cause of the connection test failure has been corrected; and
transferring, in response to the second determination, the replicated application from the external environment to the local production host to restore the application on the local production host, wherein transferring the replicated application results in at least a state of the replicated application being transferred to the local production host.

18. The system of claim 17, wherein the external environment is an edge environment.

19. The system of claim 17, wherein the external environment is a cloud environment.

20. The system of claim 17, wherein the connection test is also performed on all applications that are related to the application and if the connection test fails on at least one of all the applications that are related to the application, the connection test is considered to have failed for the application.

* * * * *